United States Patent Office 3,028,440
Patented Apr. 3, 1962

3,028,440
PRODUCTION OF BUTADIENE
Robert P. Arganbright, Texas City, Tex., assignor to Monsanto Chemical Company, St. Louis, Mo., a corporation of Delaware
No Drawing. Filed June 22, 1959, Ser. No. 821,629
4 Claims. (Cl. 260—680)

The present invention relates to an improved process for the production of butadiene. More particularly, it relates to an improved process for producing butadiene from normal butenes.

It is well known that conjugated diolefins can be obtained by pyrolysis of petroleum fractions or individual paraffins or olefins. During such pyrolysis, different kinds of reactions occur simultaneously such as dehydrogenation, cracking, and polymerization so that the product is in most instances a hydrocarbon mixture. Cracked-oil gas effluent which is an example of such a diolefin-containing product contains paraffinic hydrocarbons ranging from methane to hexane, olefins ranging from ethylene to hexylene and a small amount, usually less than ten percent, of less saturated hydrocarbons such as butadiene, isoprene, piperylene, acetylenic hydrocarbons and the like. Recovery of the diolefin from such a mixture is both complicated and expensive. Consequently, a number of special catalytic techniques have been developed or proposed whereby an olefin such as butene may be dehydrogenated to form a corresponding diolefin such as butadiene in higher concentrations than in cracking processes. Even in these methods which require many precise manipulative operations, it is difficult to maintain the yield and concentration at optimum levels.

Some of the problems in the foregoing methods are obviated by producing butadiene by splitting off hydrogen chloride from chlorinated olefins. Such a process is ordinarily a multi-step operation wherein the olefin is first chlorinated by reaction with chlorine, the desired chloroolefin is separated from the concomitant chlorinated by-products, and the chloroolefin is then dehydrochlorinated. To make the process practical from an economic point-of-view, there must be some outlet for the by-product hydrogen chloride produced or the latter must be converted back to chlorine for re-use. The various reaction steps all require different apparatus, different reaction conditions, different catalysts, etc. Thus, the advantages of a process wherein conversion of butene to butadiene can be effected in fewer operational steps using a single catalyst and producing less by-products are immediately obvious.

It is an object of the present invention to provide a process wherein normal butenes can be readily converted to butadiene in a relatively simple process and with comparatively little loss to non-useful by-products. Other objects and advantages of the invention will become apparent from the following description thereof. According to the invention, a mixture of a normal butene, hydrogen chloride, and oxygen or air is contacted at an elevated temperature with a catalyst consisting of magnesium chloride supported upon pumice to produce an effluent gas mixture from which butadiene can be recovered in good yield. Only small amounts of chlorinated by-products are obtained which are easily separated from the desired diolefin, the butadiene formed can then be easily separated from the unreacted butene by well known techniques, and the hydrogen chloride produced is continuously re-used in the process.

The invention is illustrated in the following examples which, however, are not to be construed as limiting it in any manner whatsoever.

*Example 1*

A tubular glass reactor about 4 ft. long and 40 mm. in diameter wrapped with Nichrome wire for heating and covered with asbestos insulation was employed as the reactor. A thermowell containing a thermocouple for measuring temperatures was centrally positioned in the reactor extending throughout its length. The catalyst consisting of magnesium chloride supported upon pumice was charged to the reactor and fluidized by passing nitrogen up through it while the reactor was brought up to reaction temperature. Thereafter, butene-2, hydrogen chloride, and air, at approximate rates of 640 ml. per min., 500 ml. per min. and 1200 ml. per min., respectively, were passed successively through rotameters into a mixer and preheater then into the reactor where they were contacted with the fluidized catalyst maintained at a temperature within the range from about 480° C. to about 510° C. As the reactants were introduced, the flow of nitrogen was proportionately reduced so that the velocity of the entering gaseous reactants helped to maintain the catalyst in a fluidized state.

Effluent gases from the top of the reactor were passed through a separator filled with glass wool for removal of any entrained catalyst particles, thence into a series of Dry Ice traps, and finally through a caustic scrubber for removal of unreacted HCl. Off-gas from the scrubber was vented through a wet test meter.

The product boiling below room temperature (∼25° C.) was distilled from the Dry-Ice traps into a fresh Dry-Ice trap. The low-boiling material was analyzed by means of its infrared spectra and found to be a mixture of butene-2 and 1,3-butadiene with some HCl present. Based on this analysis and the water formed in the reaction, conversion of butene-1 to butadiene-1,3 was about 30%. Less than 2% of the butene was converted to chlorinated products.

*Example 2*

The experiment of Example 1 was repeated using butene-1 and flow rates of approximately 400 ml. per min. of butene-1, 600 ml. per min. of HCl and 1000 ml. per min. of air with the fluidized magnesium chloride catalyst being maintained at a temperature from about 480° C. to 500° C. Infrared analysis of the trapped organic products boiling below room temperature showed 40% to 50% butadiene with the remainder butene-1. Calculations indicated that 30% of the butene-1 was converted to butadiene and only 3% was converted to chlorinated material.

Variations in conditions from those given in the example may be made without departing from the scope of the invention. The reaction may be carried out by mixing the butene with hydrogen chloride and air or oxygen and passing the mixture in contact with the catalyst in a heated reaction chamber; or if desired, the mixture may be introduced into the reaction zone in three separate streams; or the air or oxygen may be introduced into a mixture of the butene and hydrogen chloride. Precaution should be taken to avoid allowing the butene and oxygen to reach reaction temperature in the absence of hydrogen chloride.

In the preferred embodiment of the invention, the catalyst is employed in the fluidized or pseudo liquid state. It is maintained in a fluid or suspended state by the gaseous reactants themselves or optionally, by the use of an additional inert gas introduced from an outside source. The use of a fixed bed operation, however, is not outside the scope of the invention.

The relative proportions of the reactants may vary considerably. Preferred proportions are those corresponding to the stoichiometric proportions required to effect monoallylic chlorination of the butene charged, that is, a 1:1:0.5 ratio of butene, to HCl to oxygen or 1:1:2.5 if air is used instead of oxygen. Since HCl is not consumed in the reaction, only very small amounts, if any, of this reactant need be fed once the reaction has been initiated if provision is made for recycle of the HCl. Excesses of butene and air may be employed if desired without significantly affecting the reaction.

Contact time is not too critical and may vary from about 0.5 second to about 12 seconds.

Reaction temperature is a critical factor and the temperature must be maintained above about 450° C. to effect the reaction. Preferably, the temperature is maintained in the range from about 480° C. to 520° C. Although temperature above 520° C. and up to 600° C. can be employed, some carbon begins to deposit on the catalyst at these higher temperatures.

The catalyst for the process is readily prepared by saturating pumice with a solution, aqueous or otherwise, of magnesium chloride and filtering and drying the impregnated pumice. Further drying may be effected by means of a flow of nitrogen (or other inert gas), hydrogen chloride and/or air through the mass of catalyst while it is being heated to reaction temperature after it has been charged to the reactor. A more active catalyst is prepared from a methanolic solution of magnesium chloride. Better catalytic activity has also been observed for a catalyst prepared and dried under vacuum. The catalyst may be readily regenerated by heating with air at a temperature of about 500° C. to "burn off" any deposited carbon from its surface.

What is claimed is:

1. A process for the production of butadiene which comprises reacting a normal butene with hydrogen chloride and oxygen in the presence of a catalyst which consists essentially of magnesium chloride supported upon pumice at a temperature above about 450° C.

2. A process for the production of butadiene which comprises reacting a normal butene with hydrogen chloride and oxygen at a temperature in the range from about 450° C. to about 520° C. in the presence of a catalyst which consists essentially of magnesium chloride supported upon pumice.

3. A process for the production of butadiene which comprises reacting butene-1 with hydrogen chloride and oxygen in the molecular ratio of 1:1:0.5 at a temperature in the range from about 450° C. to about 520° C. in the presence of a catalyst which consists essentially of magnesium chloride supported upon pumice.

4. A process for the production of butadiene which comprises reacting butene-2 with hydrogen chloride and oxygen in the molecular ratio of 1:1:0.5 at a temperature in the range from about 450° C. to about 520° C. in the presence of a catalyst which consists essentially of magnesium chloride supported upon pumice.

References Cited in the file of this patent

UNITED STATES PATENTS

| | | |
|---|---|---|
| 1,925,421 | van Peski | Sept. 5, 1933 |
| 2,276,023 | Mueller-Conradi et al. | Mar. 10, 1942 |
| 2,308,489 | Cass | Jan. 19, 1943 |
| 2,644,846 | Johnson et al. | July 7, 1953 |
| 2,890,253 | Mullineaux et al. | June 9, 1959 |

FOREIGN PATENTS

| | | |
|---|---|---|
| 501,071 | Great Britain | Feb. 21, 1939 |

UNITED STATES PATENT OFFICE
CERTIFICATE OF CORRECTION

Patent No. 3,028,440            April 3, 1962

Robert P. Arganbright

It is hereby certified that error appears in the above numbered patent requiring correction and that the said Letters Patent should read as corrected below.

Column 2, line 35, for "butene-1" read -- butene-2 --.

Signed and sealed this 21st day of August 1962.

(SEAL)
Attest:

ESTON G. JOHNSON
Attesting Officer

DAVID L. LADD
Commissioner of Patents